US010350732B2

(12) United States Patent
Lukowski

(10) Patent No.: US 10,350,732 B2
(45) Date of Patent: Jul. 16, 2019

(54) BONDED ABRASIVE ARTICLES AND METHODS OF MANUFACTURE

(71) Applicant: 3M INNOVATIVE PROPERTIES COMPANY, St. Paul, MN (US)

(72) Inventor: Mark A. Lukowski, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/525,457

(22) PCT Filed: Nov. 13, 2015

(86) PCT No.: PCT/US2015/060581
§ 371 (c)(1),
(2) Date: May 9, 2017

(87) PCT Pub. No.: WO2016/081302
PCT Pub. Date: May 26, 2016

(65) Prior Publication Data
US 2017/0334039 A1 Nov. 23, 2017

Related U.S. Application Data

(60) Provisional application No. 62/083,016, filed on Nov. 21, 2014.

(51) Int. Cl.
*B24D 3/18* (2006.01)
*B24D 3/32* (2006.01)
(Continued)

(52) U.S. Cl.
CPC ............... *B24D 3/18* (2013.01); *B24D 3/32* (2013.01); *B24D 3/342* (2013.01); *B24D 18/00* (2013.01);
(Continued)

(58) Field of Classification Search
CPC .. B24D 3/18; B24D 3/32; B24D 3/342; B24D 18/0009; C09K 3/1409
See application file for complete search history.

(56) References Cited

U.S. PATENT DOCUMENTS 5,178,644 A * 1/1993 Huzinec .................. B24D 3/18
51/293
5,728,797 A * 3/1998 O'Dell .................. C08G 12/32
524/597

(Continued)

FOREIGN PATENT DOCUMENTS

JP 11-285974 10/1999
JP 2002-307314 10/2002

(Continued)

OTHER PUBLICATIONS

Studart, André R., et al., :Processing Routes to Macroporous Ceramics: A Review, *Journal of the American Ceramic Society*, vol. 89, No. 6, pp. 1771-1789 (2006).

*Primary Examiner* — Pegah Parvini
(74) *Attorney, Agent, or Firm* — Katherine M. Scholz; Aleksander Medved; David B. Patchett

(57) ABSTRACT

Methods for manufacturing bonded abrasive articles, for example vitrified bonded grinding wheels. A bondable abrasive composition is prepared including abrasive particles, a binder medium and a gamma-pyrone pore inducing material, such as ethyl maltol. A precursor abrasive structure is formed from the composition. The gamma-pyrone pore inducing material is removed from the precursor abrasive structure to provide a porous precursor abrasive structure that is further processed to provide a bonded abrasive article. In some embodiments, the binder medium includes a vitreous bonding material, and the bonded abrasive article is a porous vitrified bonded grinding wheel.

17 Claims, 5 Drawing Sheets

(51) Int. Cl.
  *B24D 3/34*    (2006.01)
  *B24D 18/00*   (2006.01)
  *C09K 3/14*    (2006.01)
(52) U.S. Cl.
  CPC ........ B24D 18/0009 (2013.01); C09K 3/1409 (2013.01)

(56) References Cited

U.S. PATENT DOCUMENTS

| | | |
|---|---|---|
| 2003/0232586 A1 | 12/2003 | Ramanath |
| 2004/0101706 A1 | 5/2004 | Bohm |
| 2006/0267000 A1* | 11/2006 | Godschalx ............ C07C 17/266 257/40 |
| 2012/0297693 A1 | 11/2012 | Zuyev |

FOREIGN PATENT DOCUMENTS

| | | |
|---|---|---|
| WO | WO 99/12867 | 3/1999 |
| WO | WO 03/018261 | 3/2003 |

\* cited by examiner

BONDED ABRASIVE ARTICLES AND METHODS OF MANUFACTURE

CROSS REFERENCE TO RELATED APPLICATIONS

This application is a national stage filing under 35 U.S.C. 371 of PCT/US2015/060581, filed 13 Nov. 2015, which claims the benefit of U.S. Provisional Patent Application No. 62/083,016, filed 21 Nov. 2014, the disclosures of which are incorporated by reference in their entirety herein.

BACKGROUND

The present disclosure relates to bonded abrasive articles such as grinding wheels and the like. More particularly, it relates to methods of making bonded abrasive articles, including formation of pores in the resultant bonded abrasive article.

Bonded abrasive articles useful for abrasive machining and other operations are three-dimensional in structure and typically include a shaped mass of abrasive particles bonded together by a binder. Such shaped mass can be, for example, in the form of a cylinder or wheel, such as a grinding wheel, cut-off wheel, etc. The main types of bonding systems used to make bonded abrasive articles are: vitrified, resinoid, and metal. With vitrified bonded abrasive articles, such as vitrified grinding wheels, a vitreous binder medium or system is used to bond the abrasive particles together. These bonds are usually vitrified at temperatures between 700° C. to 1500° C. Resinoid bonded abrasives utilize an organic binder system (e.g., phenolic binder systems) to bond the abrasive particles together to form the shaped mass. Metal bonded abrasive articles typically utilize sintered or plated metal to bond the abrasive particles. Vitrified bonded abrasive articles are different from resinoid bonded abrasive particles in that they use a vitreous phase to bond the abrasive grains and thus are processed at substantially higher temperatures. Vitrified bonded abrasive articles can withstand higher temperatures in use and are generally more rigid and brittle than resinoid bonded wheels. Vitrified bonded abrasive articles are well-suited for precision machining.

It has been found that the cutting characteristics of bonded abrasive articles, such as vitrified bonded grinding wheels, can benefit from the inclusion or formation of pores. Bonded abrasive articles containing or exhibiting porosity have an open structure (interlinked or interconnected porosity) that can provide chip clearance for high material removal and can transport more coolant into the contact area while decreasing friction. Absent adequate porosity and spacing between abrasive grains, the bonded abrasive article can become loaded with chips and cease to cut as expected. Also, porosity can facilitate a self-sharpening attribute, enabling a bonded abrasive article to shed used or worn abrasive particles to expose new cutting edges or fresh abrasive particles.

A minimal level of porosity may naturally occur when packing or molding the abrasive particles and binder medium under pressure. However, this natural porosity is typically insufficient for many vitrified bonded abrasive article end-use applications. As such, pore inducing components or additives are included with the vitreous bonding abrasive composition or mixture. Pore inducing components or additives can be non-temporary (i.e., components present in the abrasive composition and in the final bonded abrasive article), temporary (i.e., components present in the abrasive composition but not present in the final bonded abrasive article), and combinations thereof. Typical non-temporary pore inducing components include hollow glass spheres and hollow ceramic spheres. Typical temporary pore inducing components include cork, ground walnut shells, wood particles, and polymeric materials. These temporary pore inducing components are burnt out of the abrasive matrix as part of the vitrified abrasive bonded article manufacturing process.

While ground shells, wood particles, and the like are viable temporary pore inducing materials, but tend to have variability in supply and raise concerns with open fires with the kiln since the material does not sublime. Many polymeric materials are elastic in nature and experience spring-back that in turn can make it difficult to predict or precisely control a geometry of the resultant vitrified bonded abrasive article after firing. Naphthalene is another well-known temporary pore inducing material that does not present these same spring-back concerns. While more commonly known as the main ingredient of traditional moth balls, the physical and material properties of naphthalene are well-suited to the vitrified abrasive bonded article methods of manufacture. Naphthalene can be readily shaped to create pores of a desired size, does not react with conventional vitreous bonding materials or abrasive grit, and exhibits little or no volume change under expected pressures or pressing conditions. Further, naphthalene readily sublimates at the temperatures (and pressures) of the vitrified bonding process, and thus is cleanly removed from the resultant bonded abrasive article. However, naphthalene is viewed as possibly carcinogenic to humans and animals, and is not pleasant to work with. Moreover, various governmental agencies have established (or are considering) rigorous naphthalene exposure limits that may effectively render it un-usable for the mass production of vitrified bonded abrasive articles.

In light of the above, a need exists for methods of manufacturing bonded abrasive articles, such as vitrified bonded abrasive articles, with porosity induced by environmentally benign materials otherwise exhibiting the process control attributes of naphthalene.

SUMMARY

Some aspects of the present disclosure relate to methods for manufacturing bonded abrasive articles, for example vitrified bonded grinding wheels. A bondable abrasive composition is prepared including abrasive particles, a binder medium and a gamma-pyrone pore inducing material. A precursor abrasive structure is formed from the composition. The gamma-pyrone pore inducing material is removed from the precursor abrasive structure to provide a porous precursor abrasive structure that is further processed to provide a bonded abrasive article. In some embodiments, the binder medium includes a vitreous bonding material, with the porous precursor abrasive structure being subjected to elevated temperatures (e.g., at least 700° C.) to effectuate a vitrified bond. In other embodiments, ethyl maltol is provided as the pore inducing material and is removed from the precursor structure by sublimation and/or evaporation.

DETAILED DESCRIPTION

Aspects of the present disclosure relate to methods of manufacturing bonded abrasive articles, precursor abrasive structures generated during the manufacturing process, and resultant bonded abrasive articles. In general terms, manufacturing methods of the present disclosure entail incorporating a pore inducing material into a bondable abrasive composition, forming (e.g., pressing) the bondable abrasive composition to a desired shape so as to obtain a precursor abrasive structure (e.g., a "green" body), processing the precursor abrasive structure to remove (e.g., sublimation) the pore inducing material so as to obtain a porous precursor abrasive structure, and processing the porous precursor abrasive structure to effectuate formation of a bonded abrasive article. The processing steps associated with transitioning of the precursor abrasive structure to a bonded abrasive article can be tailored to the particular bonding agent employed. Regardless, the techniques of the present disclosure enable the facile, controlled, environmentally benign induction of porosity into the resultant bonded abrasive article with little or no volume change during processing of the precursor abrasive structure. Techniques of the present disclosure are particularly useful with the manufacture of vitrified bonded abrasive articles, but are also applicable to other abrasive article bonding formats such as resinoid and metal. Thus, while vitreous bonding examples are discussed below, the present disclosure is in no way limited to vitrified bonded abrasive articles. Moreover, the bonded abrasive articles of the present disclosure can assume various forms, and in some embodiments are suitable for the machining and finishing of metals and other materials, such as grinding wheels, cut-off wheels, hones, whet stones and the like.

Figure 1:
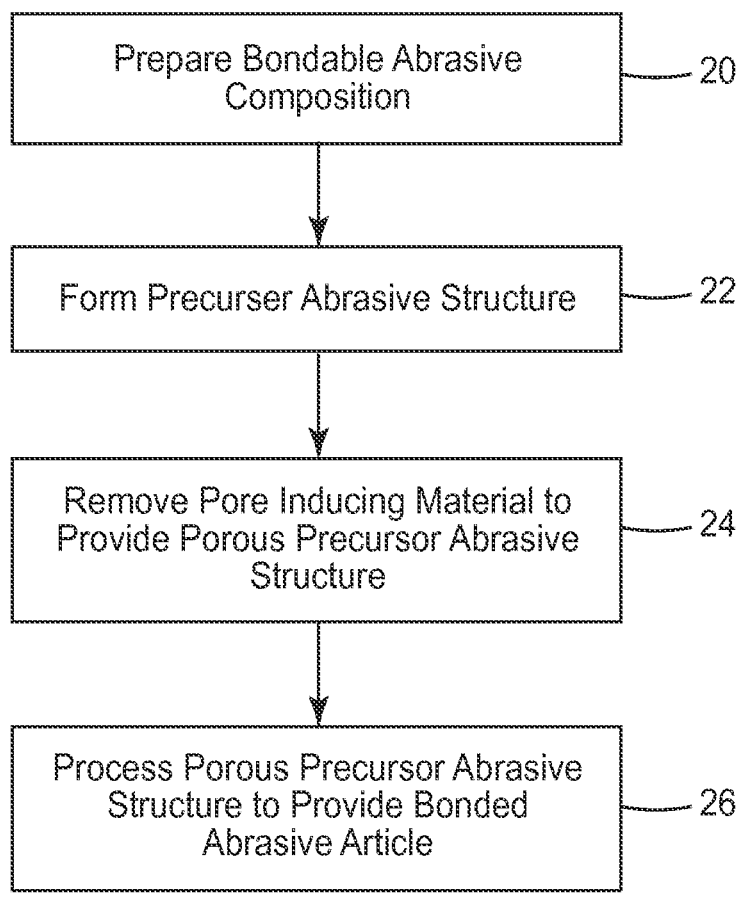
FIG. 1 is a flow chart of a method for manufacturing bonded abrasive articles in accordance with principles of the present disclosure.

FIG. 1 is a flow diagram illustrating techniques of the present disclosure for manufacturing bonded abrasive articles. At 20, a bondable abrasive composition is prepared, for example by mixing together the components or ingredients described below. In general terms, the bondable abrasive compositions of the present disclosure include abrasive particles, a bonding or binder medium, and pore inducing material. The particular type and quantity of the abrasive particles and the binder medium are not critical to the present disclosure so long as they possess the desired abrasive and binding properties, respectively, for the intended end use of the final bonded abrasive article. Aspects of the present disclosure reside in a selection of the pore inducing material. Thus, pore inducing materials of the present disclosure are initially discussed below, followed by exemplary identifications of abrasive particles, binder mediums, and other optional bondable abrasive composition ingredients.

The pore inducing material is, in some embodiments, a gamma-pyrone in crystalline solid form. Gamma-pyrones are heterocyclic compounds that have a ring containing five carbon atoms, one oxygen atom with two double bonds and a second oxygen atom attached to a carbon atom in the para-position. It has surprisingly been found that at least some gamma-pyrone materials, for example ethyl maltol, essentially replicate the desired performance characteristics of naphthalene in connection with the manufacture of vitrified bonded abrasive articles, but are environmentally benign. Ethyl maltol, for example, neither is suspected to be particularly toxic nor is it subject to the same strict exposure limits as naphthalene. In fact, it is used throughout the world as a food additive to give a freshly baked taste and smell. Other gamma-pyrones, such as methyl maltol, are also envisioned by the present disclosure.

As a point of reference, the pore inducing materials of the present disclosure (e.g., ethyl maltol) exhibit or satisfy at least the following properties: First, the pore inducing material is environmentally benign. Naphthalene does not satisfy this criterion. Second, the pore inducing material does not react with the selected abrasive particles, bonding medium, or other ingredients employed with the bondable abrasive composition. Third, the pore inducing material is able to induce or create pores of a specific size. Fourth, the pore inducing material exhibits little or no volume change during the precursor abrasive structure formation step (e.g., pressing). The pore inducing material sublimates or burns out cleanly and does not leave behind any residue. Finally, the pore inducing material has little or no water solubility.

It has surprisingly been found that ethyl maltol meets each of these criteria. Ethyl maltol is a crystalline organic solid available in various dimensions exhibiting many physical and material properties strongly similar to naphthalene. Ethyl maltol plastically deforms under pressing conditions (e.g., does not store elastic energy), is sparingly soluble in water, and sublimes cleanly at low temperatures (on the order, for example, of about 140° C.). It has further been surprisingly found that ethyl maltol can be employed as a direct or "drop-in" replacement for naphthalene with existing vitrified bonded abrasive article manufacturing processes. It is expected that other gamma-pyrones as envisioned by the present disclosure are equally well-suited.

Returning to FIG. 1, the abrasive particle component of the bondable abrasive composition (step 20) can assume various forms as known to those of ordinary skill and otherwise appropriate for bonded abrasive articles. For example, the abrasive particles can be or include abrasive grains formed of a hard material (e.g., Mohs hardness of at least about 7). The abrasive particles can include a combination of different types of abrasive particulate materials. The abrasive particles can include abrasive agglomerates, unagglomerated abrasive particles, and combinations thereof. In some embodiments, the abrasive particles can include or be made of inorganic material such as carbides, oxides, nitrides, borides, and combinations thereof. In some embodiments, the abrasive particles can be or include a superabrasive particulate material such as diamond or cubic boron nitride. In some embodiments, the abrasive particles can include or comprise ceramic particles, composed, for example, of crystallites of alpha alumina, magnesium alumina spinel, and a rare earth hexagonal aluminate prepared using sol-gel precursor alpha alumina particles. Other non-limiting examples of useful abrasive particles include, but are not limited to, fused aluminum oxide, treated aluminum oxide, white fused aluminum oxide, ceramic aluminum oxide materials such as those commercially available under the trade designation 3M CERAMIC ABRASIVE GRAIN from 3M Company of St. Paul, Minn., black silicon carbide, green silicon carbide, titanium diboride, boron carbide, tungsten carbide, titanium carbide, garnet, fused alumina zirconia, sol-gel derived abrasive particles, iron oxide, chromia, ceria, zirconia, titania, silicates, tin oxide, silica (such as quartz, glass beads, glass bubbles, and glass fibers), silicates (such as talc, clays (e.g., montmorillonite), feldspar, mica, calcium silicate, calcium metasilicate, sodium aluminosilicate, sodium silicate), flint, and emery. The abrasive particles can be or include crushed particulates and/or shaped particles (e.g., ceramic shaped abrasive particles). The abrasive particles can be coated (e.g., coated with a coupling agent).

As mentioned above, the bonding medium of the bondable abrasive composition assume various forms as known to those of ordinary skill and otherwise appropriate for bonded abrasive articles. The binder material typically comprises a glassy inorganic material (e.g., as in the case of vitrified bonded abrasive articles), metal, or an organic resin (e.g., as in the case of resin-bonded abrasive articles).

In some embodiments, techniques of the present disclosure are beneficial with vitrified bond processing, with the bonding medium comprising a vitreous (also referred to as vitrified) bonding material or bond phase. The vitreous bonding material serves to retain the abrasive particles in the composition or in the article. The vitreous bond phase that binds together the abrasive particles can be of any suitable composition.

The vitreous bond phase, also known in the art as a "vitrified bond", "vitreous bond", "ceramic bond" or "glass bond", may be produced from a vitreous bond precursor composition comprising a mixture or combination of one or more raw materials that when heated to a high temperature melt and/or fuse to form an integral vitreous matrix phase.

The raw materials are not particularly limited. Typical raw materials for forming a vitreous bond phase can be selected from metal oxides (including metalloid oxides), non-metal oxides, non-metal compounds, silicates and naturally occurring and synthetic materials, and combinations of one or more of these raw materials.

Metal oxide vitreous binders can, for example, be selected from silicon oxide, magnesium oxide, calcium oxide, barium oxide, lithium oxide, sodium oxide, potassium oxide, iron oxide, titanium oxide, manganese oxide, zinc oxide, and metal oxides that can be characterized as pigments such as cobalt oxide, chromium oxide, or iron oxide, and combinations thereof.

Non-metal oxides can, for example, be selected from boron oxide, phosphorous oxide and combinations thereof. Suitable examples of non-metal compounds include boric acid.

Silicates can, for example, be selected from aluminum silicates, borosilicates, calcium silicates, magnesium silicates, sodium silicates, lithium silicates, and combinations thereof.

Minerals can, for example, be selected from clay, feldspar, kaolin, wollastonite, borax, quartz, soda ash, limestone, dolomite, chalk, and combinations thereof.

During manufacture of a vitrified bonded abrasive article, the vitreous binder, in a powder form, may be mixed with a temporary binder, typically an organic binder. The vitrified binders may also be from a frit, for example anywhere from about 1 to 100 percent frit, but generally 20 to 100 percent frit. A frit is a composition that has been pre-fired prior to its employment in a vitreous bond precursor composition for forming the vitreous bond phase of a bonded abrasive article. As used herein, the term "frit" is a generic term for a material that is formed by thoroughly blending a mixture comprising one or more frit forming components, followed by heating (also referred to as pre-firing) the mixture to a temperature at least high enough to melt it; cooling the glass and pulverizing it. Some examples of common materials used in frit binders include feldspar, borax, quartz, soda ash, zinc oxide, whiting, antimony trioxide, titanium dioxide, sodium silicofluoride, flint, cryolite, boric acid, and combinations thereof. These materials are usually mixed together as powders, fired to fuse the mixture, and then the fused mixture is cooled. The cooled mixture is crushed and screened to a very fine powder to then be used as a first binder. The temperature at which these frit bonds are matured is dependent upon its chemistry, but may range from anywhere from about 600° C. to about 1800° C.

Non-limiting examples of suitable ranges for vitreous bonding materials or compositions (for use with the bondable abrasive compositions of the present disclosure) can be specified as follows: 25 to 90% be weight, optionally 35 to 85% by weight, based on the total weight of the vitreous bonding material, of $SiO_2$; 0 to 40% by weight, optionally 0 to 30% by weight, based on the total weight of the vitreous bonding material, of $B_2O_3$; 0 to 40% by weight, optionally 5 to 30% by weight, based on the total weight of the vitreous bonding material, of $Al_2O_3$; 0 to 5% by weight, optionally 0 to 3% by weight, based on the total weight of the vitreous bonding material, of $Fe_2O_3$; 0 to 5% by weight, optionally 0 to 3% by weight, based on the total weight of the vitreous bonding material, of $TiO_2$; 0 to 20% by weight, optionally 0 to 10% by weight, based on the total weight of the vitreous bonding material, of CaO; 0 to 20% by weight, optionally 1 to 10% by weight, based on the total weight of the vitreous bond, of MgO; 0 to 20% by weight, optionally 0 to 10% by weight, based on the total weight of the vitreous bonding material, of $K_2O$; 0 to 25% by weight, optionally 0 to 15% by weight, based on the total weight of the vitreous bonding material, of $Na_2O$; 0 to 20% by weight, optionally 0 to 12% by weight, based on the total weight of the vitreous bonding material, of $Li_2O$; 0 to 10% by weight, optionally 0 to 3% by weight, based on the total weight of the vitreous bonding material, of ZnO; 0 to 10% by weight, optionally 0 to 3% by weight, based on the total weight of the vitreous bonding material, of BaO; and 0 to 5% by weight, optionally 0 to 3% by weight, based on the total weight of the vitreous bonding material, of metallic oxides (e.g., CoO, $Cr_2O_3$ or other pigments). Other specific, non-limiting examples of a vitreous binder useful with methods and systems of the present disclosure include, based upon weight, 47.61% $SiO_2$, 16.65% $Al_2O_3$, 0.38% $Fe_2O_3$, 0.35% $TiO_2$, 1.58% CaO, 0.10% MgO, 9.63% $Na_2O$, 2.86% $K_2O$, 1.77% $Li_2O$, 19.03% $B_2O_3$, 0.02% $MnO_2$, and 0.22% $P_2O_5$; and 63% $SiO_2$, 12% $Al_2O_3$, 1.2% CaO, 6.3% $Na_2O$, 7.5% $K_2O$, and 10% $B_2O_3$. Still other non-limiting examples of vitreous binders useful with the present disclosure based upon a molar ratio include 3.77% $SiO_2$, 0/58% $Al_2O_3$, 0.01% $Fe_2O_3$, 0.03% $TiO_2$, 0.21% CaO, 0.25% MgO, 0.47% $Na_2O$, and 0.07% $K_2O$.

In some embodiments, a vitreous binder-format of the bonding medium can include various additives as known in the art both to assist in the making of the abrasive article and/or improve the performance of such articles. Such conventional additives that may also be used in accordance with the present disclosure include, but are not limited to, lubricants, fillers, temporary binders, and processing aids. Organic binders are optionally used as temporary binders. Typical temporary binders include dextrins, urea resins (include urea formaldehyde resins), polysaccharides, polyethylene glycol, polyacrylates, and any other type of glue, etc. These binders may also include a liquid component, such as water or polyethylene glycol, viscosity or pH modifiers or mixing aids. The use of temporary binders may improve homogeneity and the structural quality of the pre-fired or green pressed body, as well as of the fired article. Because the temporary binders are burned out during firing, they not become part of the final or finished bonded abrasive article.

While aspects of the present disclosure are highly useful with the manufacture of vitrified bonded abrasive articles, other bonding formats are also envisioned. Thus, the bonding medium of the bondable abrasive composition can alternatively include a metal binder (e.g., tin, copper, aluminum, nickel, etc.) or an organic resin as known in the art to be useful for resin-bonded abrasive articles.

Regardless of the exact format, the selected ingredients are mixed at 20 to prepare the bondable abrasive composition. The mixing procedures may employ conventional and known equipment in the art. At 22, the bondable abrasive composition is formed to a desired shape so as to obtain the precursor abrasive structure (e.g., a green structure). Forming can for example be accomplished by molding with or without pressing. Typical forming pressures can vary within wide ranges and may be selected from pressures ranging from 0 to 400 $kg/cm^3$, depending on the make-up of the bondable abrasive composition and desired characteristics of the resultant precursor abrasive structure. The precursor abrasive structures of the present disclosure include a pore inducing material in the form of at least one gamma-pyrone, for example ethyl maltol; in other embodiments, the precursor abrasive structures of the present disclosure include a vitreous bonding medium and a gamma-pyrone (e.g., ethyl maltol) pore inducing material; in other embodiments, the precursor abrasive structures of the present disclosure includes a vitreous bonding medium and a gamma-pyrone (e.g., ethyl maltol) pore inducing material, and does not include naphthalene.

The pore inducing material is removed from the precursor abrasive structure so as to obtain a porous precursor abrasive structure at 24. The processing necessary to accomplish removal of the pore inducing material can be a function of the pore inducing material composition and other properties, and in some embodiments entails subjecting the precursor abrasive structure to heat (e.g., temperature above room temperature) for a dwell time sufficient to effectuate sublimation of the pore inducing material. For example, in some embodiments where the pore inducing material is or includes ethyl maltol, it has surprisingly been found that the ethyl maltol will completely and cleanly sublime/evaporate from the precursor abrasive structure at temperatures for example on the order of at least 140° C., alternatively on the order of 175° C., at dwell times on the order of about 0.5-10 hours (it being understood that completeness of removal depends on the amount of ethyl maltol, thickness of the article, temperature, dwell time, etc.). In related embodiments, the pore inducing material can be removed by subjecting the precursor abrasive structure to increasing heated conditions in various stages. For example, the precursor abrasive structure can be subjected to heated conditions at temperatures in the range of 70° C.-140° C. for a first period of time, and subsequently to further elevated temperatures (e.g., on the order of 140° C.-175° C.) for a second period of time. Other temperature and/or dwell time conditions are also envisioned appropriate to achieve complete sublimation of the pore inducing material from the precursor abrasive structure. Regardless, openings or pores remain in the structure following removal of the pore inducing material.

At 26, the porous precursor abrasive structure is processed to effectuate formation of the bonded abrasive article. The process parameters appropriate to achieve complete bonding or binding are selected in accordance with the specific bonding format. For example, with vitrified bonded abrasive articles, the porous precursor abrasive structure is heated or "fired" at high temperatures. The vitreous bond phase is usually produced in the firing step, typically at temperatures in the range from about 700° C. to about 1500° C., optionally in the range from about 750° C. to about 1350° C., optionally in the range from about 800° C. to about 1300° C. Good results may also be obtained at temperatures of about 1000° C. or less, or from about 1100° C. to about 1200° C. in some embodiments. The actual temperature at which the vitreous bond phase is formed depends, for example, on the particular bond chemistry. Firing of the vitreous bond composition is typically accomplished by raising the temperature from room temperature to the maximum temperature over a prolonged period of time (e.g., about 10-130 hours), holding at the maximum temperature (e.g., for about 1-20 hours), and then cooling the fired article to room temperatures over an extended period of time (e.g., about 10-140 hours). It should be understood that the temperature selected for the firing step and the composition of the vitreous bonding medium should be chosen so as to not have a detrimental effect on the physical properties and/or composition of the abrasive particles contained in the bondable abrasive composition or the final bonded abrasive article. Differing processing conditions can be employed with metal binding medium or organic resin binding medium as are known to those of ordinary skill.

Consistent with the above explanations, while the techniques of FIG. 1 reflect the removal of the pore inducing material (step 24) and the subsequent processing at step 26 as being distinct operations, in other embodiments, the "steps" can be combined. Namely, the precursor abrasive structure is subjected to elevated temperatures over an extended period of time sufficient to achieve a vitrified bond; as the precursor abrasive structure experiences the initial stages of this heating or firing process, the pore inducing material (e.g., ethyl maltol) sublimes out of the structure.

The resultant bonded abrasive articles can assume various forms and can exhibit various properties. For example, the bonded abrasive article can be a grinding wheel, a cut-off wheel, a hone, a whet stone and the like. In some non-limiting examples, the amount of abrasive particles in the bonded abrasive article may vary widely and can range, for example, from 10 to 80%, optionally from 25 to 65%. The abrasive particles can be homogeneously or non-homogeneously distributed in the bonded abrasive article. The amount of bonding medium may also vary widely and can range, for example, from 1 to 60% by volume, optionally 2.5 to 40% by volume. In some embodiments, the bonded abrasive article has a density of at least 1.20 $g/cm^3$, optionally at least 1.30 $g/cm^3$, optionally a density in the range of from 1.35 to 2.65 $g/cm^3$. The bonded abrasive article can have any useful range of porosity; in some embodiments, the bonded abrasive article has a porosity of from about 5 to about 80% by volume, optionally from about 20 to about 70% by volume. The particular design of the bonded abrasive article is not limited and can be selected from "monolithic" designs and "zonal" designs (such as segmented and layered designs). Both designs can include reinforcing materials (e.g., reinforcing the center bore of a wheel-type bonded abrasive article), such as a glue or other thermosetting resin, for example resins selected from epoxy resins, polycondensates, and phenolic resins.

EXAMPLES AND COMPARATIVE EXAMPLES

Objects and advantages of the present disclosure are further illustrated by the following non-limiting examples and comparative examples. The particular materials and amounts thereof recited in these examples, as well as other conditions and details, should not be construed to unduly limit the present disclosure.

Unless otherwise noted, all parts, percentages, ratios, etc. in the Examples and the rest of this specification are by weight. Unless stated otherwise, all reagents were obtained, or are available, from fine chemical vendors such as Sigma-Aldrich Company, St. Louis Mo., or may be synthesized by known methods. In Tables in the Examples, "NA" means not applicable.

The following abbreviations are used to describe the examples:
° C.: degrees Centigrade
$F_x$: Force in the x-direction during grinding
$F_z$: Force in the z-direction during grinding
$g/cm^3$: grams per cubic centimeter
GPa: GigaPascal
$h_{mom}$ Chip thickness
kN: kiloNewton
kPa: kilopascal
kW: kilowatt
m/s: meters per second
mil: $10^{-3}$ inch
mm: millimeter
mm/min: millimeters per minute
$mm^3/mm/sec$: cubic millimeters per millimeters per second
μm: micrometer
MPa: MegaPascal
N: Newton
psi: pounds per square inch
Q-prime: Specific Material Removal Rate
Ra: Arithmetic average of absolute values for surface roughness
Speed Ratio: Ratio of grinding wheel speed to workpiece speed Abbreviations for materials and reagents used in the examples are as follows:
Dextrin: Obtained from Agrana Starke GmbH, Austria
Ethyl maltol: 3-hydroxy-2-ethyl-4-pyrone, obtained from Parchem Fine & Specialty Chemicals, New Rochelle, N.Y.
F54: A white fused alumina, obtained under the trade designation "ALODUR WSK F54" from Treibacher Schiefmittel, AG, Austria
F60: A white fused alumina, obtained under the trade designation "ALODUR WSK F60" from Treibacher Schiefmittel, AG, Austria.
F70: A white fused alumina, obtained under the trade designation "ALODUR WSK F70" from Treibacher Schiefmittel, AG, Austria.
TBR: A temporary binder resin that includes a UFR and optionally a wax component.
UFR: A urea-formaldehyde resin, obtained under the trade designation "DURITE 3029c" from Momentive Specialty Chemicals, Inc., Columbus, Ohio.
V601: A glass frit blend.
V904: A glass frit blend.

Example 1

A vitrified bonded abrasive bar was prepared in accordance with principles of the present disclosure, including ethyl maltol as the pore inducing material. More particularly, the vitrified bonded abrasive bar of Example 1 was prepared by homogenously dispersing: 1) abrasive particles (alumina minerals F54, F60 and F70); 2) binder medium (V601 (vitreous bonding medium), Dextrin (solid temporary binder additive), and TBR (liquid temporary binder additive)); and 3) gamma-pyrone pore inducing material (ethyl maltol) according to the formulation listed in Table 1 for 5 minutes at 21° C. by means of an air drive mixer to provide a bondable abrasive composition. After 30 minutes, the bondable abrasive composition was spread into a 12 by 15 by 120 mm die and pressed to provide a precursor abrasive structure (or "green bar"). A density of the precursor abrasive structure of Example 1 was measured at 2.005 $g/cm^3$. The precursor abrasive structure was removed from the die, transferred to an oven (refractory sager), and subjected to the thermal cycle listed in Table 2 in order to sublimate/evaporate the ethyl maltol pore inducing material, resulting in a porous precursor abrasive structure. Additional fused alumina grits were placed inside the oven for a final firing operation to prevent bond flow and fusion to the oven. The porous precursor abrasive structure was subjected to a second, vitreous bonding, thermal cycle according to the conditions listed in Table 3, resulting in a bonded abrasive structure (vitrified bonded bar). The vitrified bonded bar was allowed to cool to 21° C.

Comparative Example A

A vitrified bonded abrasive bar was prepared according to the procedure generally described in Example 1, except that naphthalene was substituted for ethyl maltol as the pore inducing material, per the formulation listed in Table 1. A density of the precursor abrasive structure of Comparative Example A was 2.010 $g/cm^3$.

Comparative Example B

A vitrified bonded abrasive bar was prepared according to the procedure generally described in Example 1, except that a pore inducing material was not included, per the formulation listed in Table 1. A density of the precursor abrasive structure of Comparative Example B was 2.090 $g/cm^3$.

TABLE 1

| | Vitreous Abrasive Composition (Parts by Weight) | | | | | | | |
|---|---|---|---|---|---|---|---|---|
| Sample | F54 | F60 | F60 | V601 Or V904 | Dextrin | TBR | Naphthalene | Ethyl maltol |
| Comparative A | 18.35 | 45.87 | 27.52 | 8.26 | 0.95 | 3.55 | 18.35 | 0 |
| Comparative B | 18.43 | 46.08 | 27.65 | 7.83 | 0.78 | 2.67 | 0 | 0 |
| Comparative C | 17.70 | 44.25 | 26.55 | 11.50 | 0.85 | 3.69 | 14.30 | 0 |
| Comparative D | 17.70 | 44.25 | 26.55 | 11.50 | 1.30 | 4.74 | 23.84 | 0 |
| Example 1 | 18.35 | 45.87 | 27.52 | 8.26 | 0.95 | 3.55 | 0 | 20.28 |

TABLE 1-continued

Vitreous Abrasive Composition
(Parts by Weight)

| Sample | F54 | F60 | F60 | V601 Or V904 | Dextrin | TBR | Naphthalene | Ethyl maltol |
|---|---|---|---|---|---|---|---|---|
| Example 2 | 17.70 | 44.25 | 26.55 | 11.50 | 0.85 | 3.69 | 0 | 14.30 |
| Example 3 | 17.70 | 44.25 | 26.55 | 11.50 | 1.30 | 4.74 | 9 | 23.84 |

TABLE 2

| Thermal Stage | Heating Rate (° C./Hour) | Target Temperature (° C.) | Hold Time (Hours) |
|---|---|---|---|
| 1 | 7.0 | 70 | 0 |
| 2 | 4.0 | 90 | 0 |
| 3 | 2.5 | 130 | 0 |
| 4 | 25.0 | 155 | 2.0 |
| 5 | 1.0 | 165 | 7.0 |

TABLE 3

| Thermal Stage | Heating Rate (° C./Hour) | Target Temperature (° C.) | Hold Time (Hours) |
|---|---|---|---|
| 1 | 2.0 | 420 | 2.0 |
| 2 | 2.0 | 700 | 0.5 |
| 3 | 3.0 | 880 | 4.0 |

Figure 2:
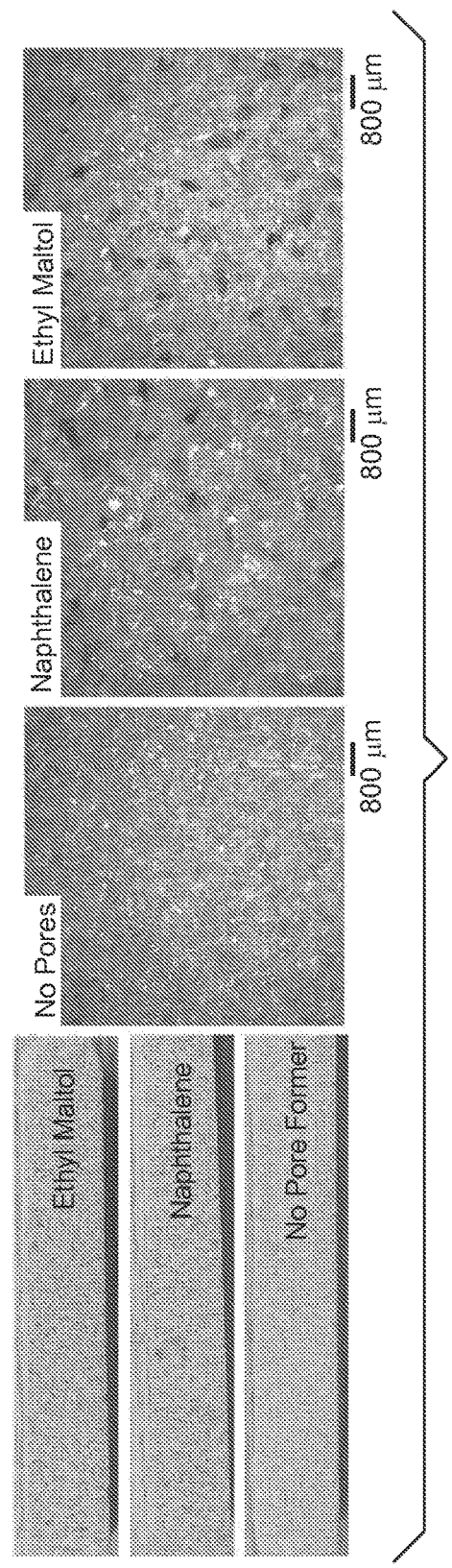
FIG. 2 presents a comparison of photographs and optical micrograph images of a bonded abrasive article in accordance with principles of the present disclosure with vitrified bonded abrasive articles manufactured using naphthalene as a pore inducing material and manufactured without a pore inducing material.

Photographs and optical micrographs were obtained of the samples of Example 1, Comparative Example A, and Comparative Example B, and are reproduced at FIG. 2. As shown, the ethyl maltol generated a nearly identical pore structure to that observed when naphthalene was used. Moreover, these highly similar results were achieved using the same general fabrication methods for Example 1 and Comparative Example A. It was surprisingly found that ethyl maltol can serve as a "drop in" replacement for naphthalene in the manufacture of porous vitrified bonded abrasive articles. It is apparent from a comparison with the sample fabricated without any additional pore inducing material (i.e., Comparative Example B) that the pore forming material can be important for inducing additional porosity.

Example 2

A vitreous abrasive composition (bondable abrasive composition) was prepared as generally described in Example 1, per the formulation in Table 1. The composition was transferred to a 400 mm diameter by 25 mm width wheel mold having a 127 mm bore, and was pressed to provide a precursor abrasive structure (or "green body") having a density of 2.12 g/cm$^3$. The precursor abrasive structure was subjected to pore former burn-off and vitreous bonding thermal cycles to provide a bonded abrasive article in the form of a grinding wheel.

Example 3

A bonded abrasive article in the form of a vitrified bonded grinding wheel was prepared as generally described in Example 2, per the formulation in Table 1, wherein the wheel mold dimensions were 195 mm diameter by 200 mm width by 90 mm bore. The precursor abrasive structure (or "green wheel") of Example 3 had a density of 2.15 g/cm$^3$.

Comparative Example C

A bonded abrasive article in the form of a vitrified bonded grinding wheel was prepared as generally described in Example 2, except that ethyl maltol was substituted by an equal volume of naphthalene, per the formulation in Table 1. The precursor abrasive structure (or "green wheel") of Comparative Example 3 had a density of 2.12 g/cm$^3$.

Comparative Example D

A bonded abrasive article in the form of a vitrified bonded grinding wheel was prepared as generally described in Example 3, except that ethyl maltol was substituted by an equal volume of naphthalene, per the formulation in Table 1. The precursor abrasive structure (or "green wheel") of Comparative Example D had a density of 2.15 g/cm$^3$.

Physical characteristics of the vitrified abrasive bonded articles/wheels of Examples 2 and 3, and Comparative Examples C and D were measured according to the following test methods. Results are listed in Table 4.

Porosity: A calculated value

Surface Hardness: Measured using a Grade-O-Meter obtained from Abrasive Engineering Corp., Sacramento, Calif.

Dynamic Young's Modulus (Edyn): Measured using a GrindoSonic, obtained from J. W. Lemmens, N.V., Leuven, Belgium

TABLE 4

| Sample | Porosity (%) | Surface Hardness | Edyn (GPa) | Final Density (g/cm$^3$) |
|---|---|---|---|---|
| Example 2 | 50.8 | 71 | 27.5 | 1.77 |
| Comparative C | 50.8 | 72 | 27.9 | 1.78 |
| Example 3 | 55.4 | 85 | 22.3 | 1.60 |
| Comparative D | 55.4 | 81 | 23.9 | 1.61 |

Creep Feed Grinding Tests

Figure 3:
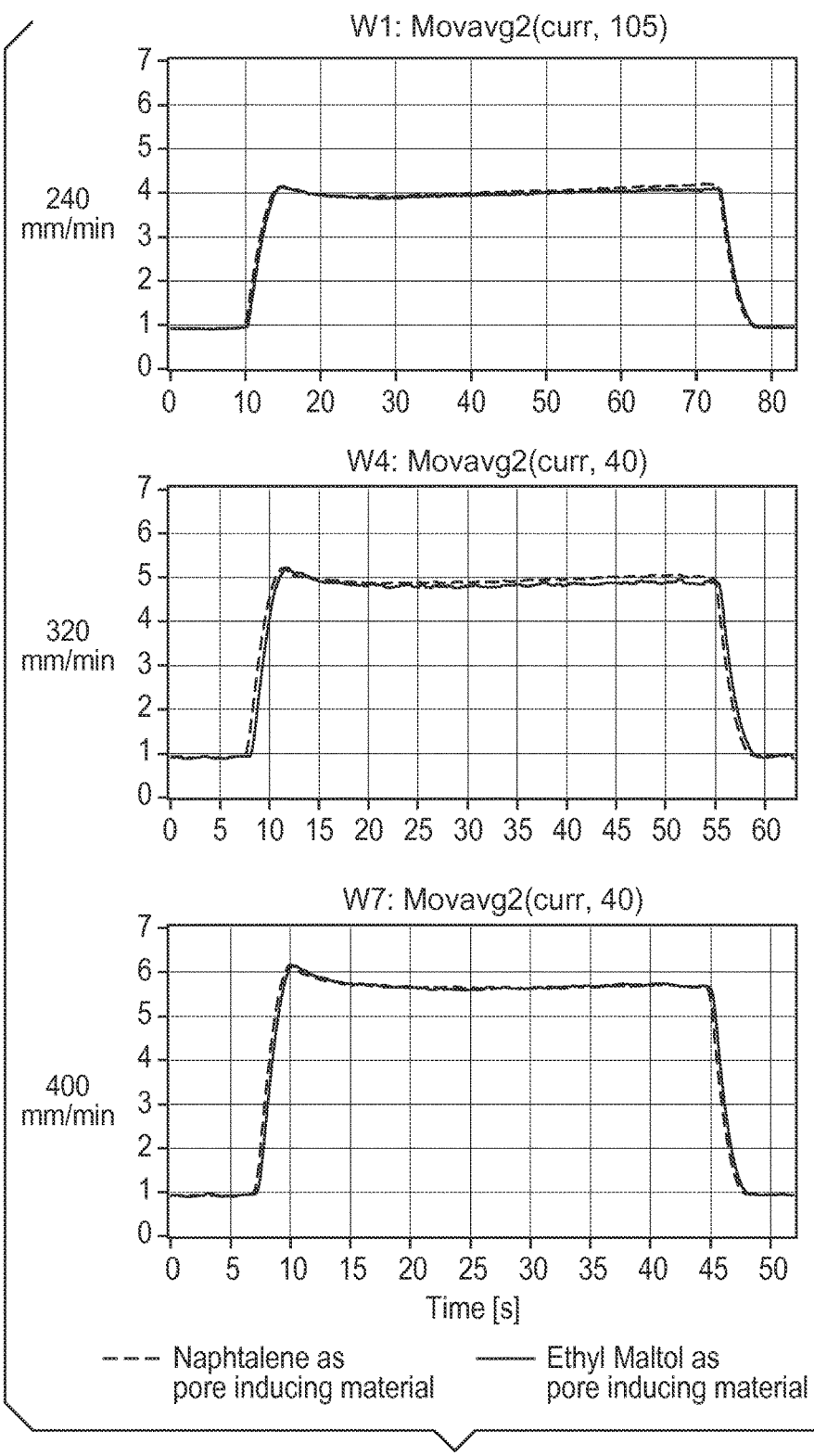
FIG. 3-5 are graphs illustrating a comparison of performance characteristics of a bonded abrasive article manufactured in accordance with methods of the present disclosure and a bonded abrasive article manufactured using conventional methods.
Figure 4:
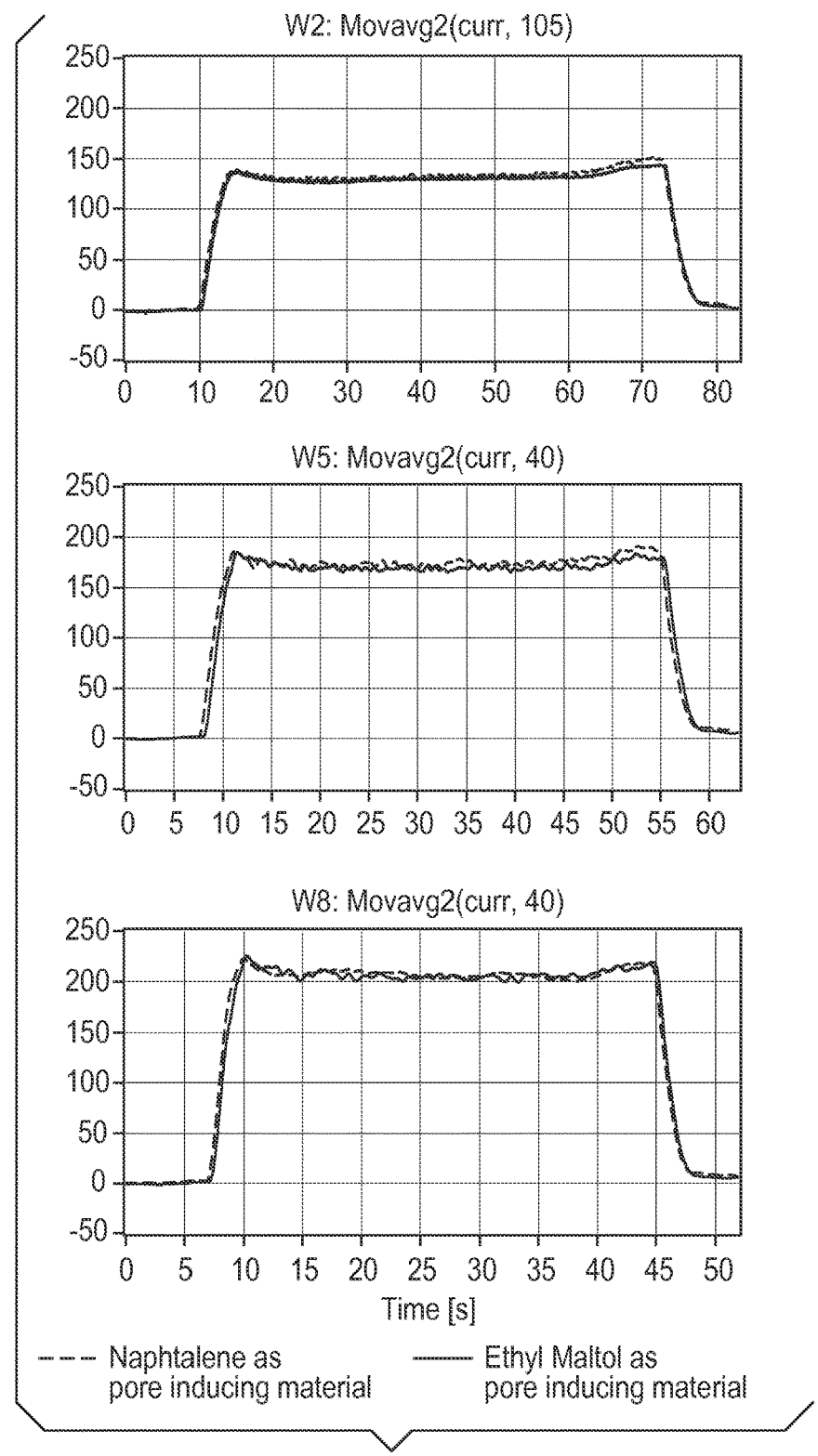
Figure 5:
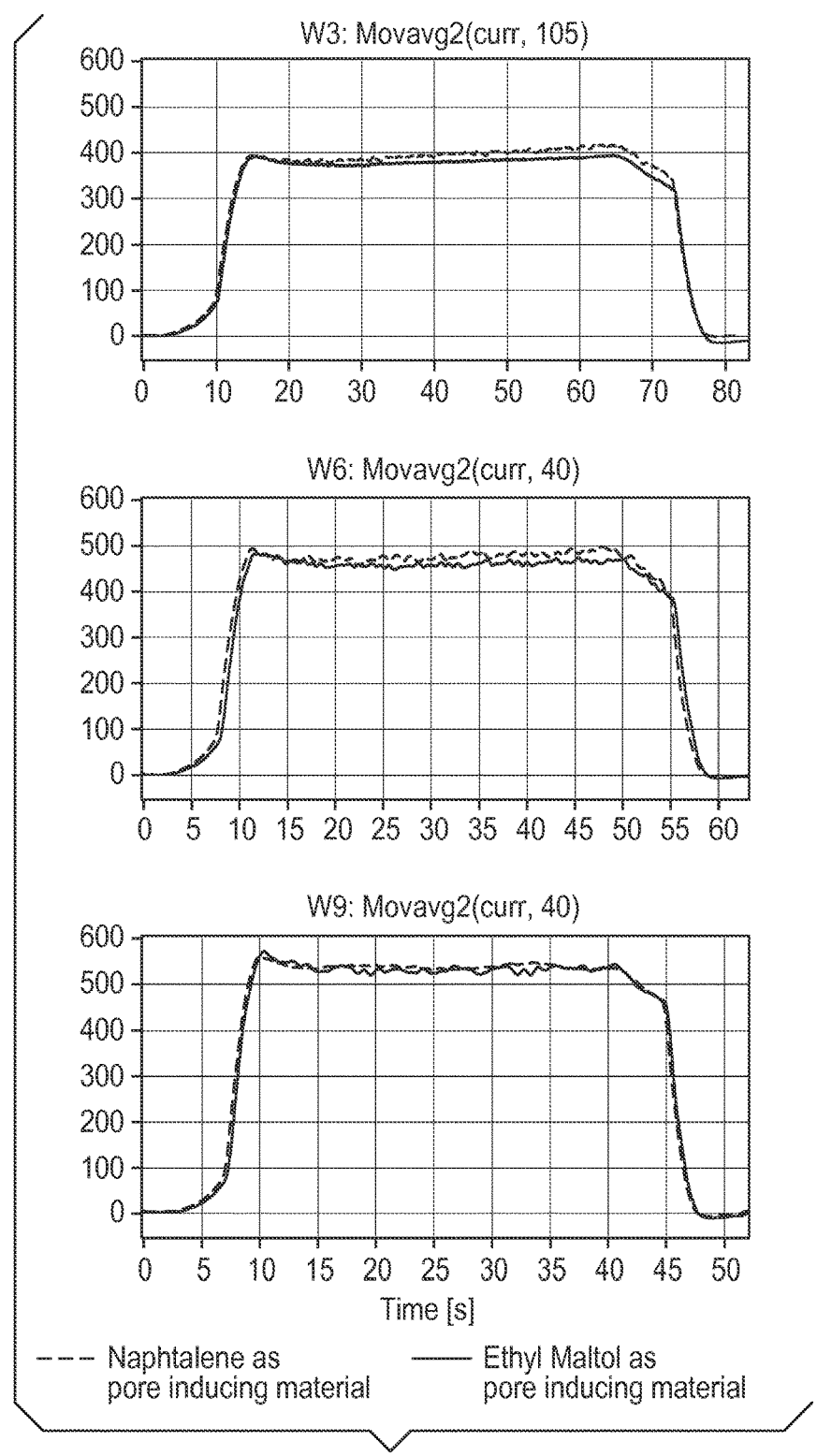

Example 2 and Comparative C were evaluated using a model "PROFITMAT MT480" grinder obtained from Blohm Jung, GmbH, Germany, under the following conditions. Results are listed in Tables 5-8 and FIGS. 3-5.

Workpiece: A 250 by 18 by 65 mm low allow hardened steel, Rockwell hardness 60 HRc, type "K720", obtained from Bohler Edelstahl GmbH & Co KG, Kapfenberg, Austria.

Coolant: 3 to 5% emulsion (v/v) of oil or synthetic lubricant (for example Castrol Syntilo 81E or Castrol Syntilo CR4, available from Castrol Ltd. Or Castrol Group, or Cimtech® D81, available from Cimcool®

Grinding Conditions:

| Wheel Speed 20 m/s Infeed 1 mm | | | |
|---|---|---|---|
| Feed Rates (m/min) | Q-prime mm3/mm/s | $h_{mom}$ (μm) | Speed Ratio |
| 240 | 4.00 | 0.200 | 5,000 |
| 320 | 5.33 | 0.267 | 3,750 |
| 400 | 6.67 | 0.333 | 3,000 |

Dressing:

| Type | CVD, 0.8 by 0.8 mm |
|---|---|
| Infeed per Path | 20 μm |
| Overlap | 2 |

TABLE 5

| Sample | Feed Rate (mm/min) | Power (kW) |
|---|---|---|
| Example 2 | 240 | 3.03 |
| Comparative C | 240 | 3.09 |
| Example 2 | 320 | 3.9 |
| Comparative C | 320 | 4.0 |
| Example 2 | 400 | 4.7 |
| Comparative C | 400 | 4.7 |

TABLE 6

| Sample | Feed Rate (mm/min) | Fz (N) |
|---|---|---|
| Example 2 | 240 | 402 |
| Comparative C | 240 | 420 |
| Example 2 | 320 | 489 |
| Comparative C | 320 | 504 |
| Example 2 | 400 | 562 |
| Comparative C | 400 | 570 |

TABLE 7

| Sample | Feed Rate (mm/min) | Ra (μm) |
|---|---|---|
| Example 2 | 240 | 0.596 |
| Comparative C | 240 | 0.544 |
| Example 2 | 320 | 0.701 |
| Comparative C | 320 | 0.528 |
| Example 2 | 400 | 0.714 |
| Comparative C | 400 | 0.536 |

TABLE 8

| Sample | Feed Rate (mm/min) | Tool Wear (μm) |
|---|---|---|
| Example 2 | 240 | 7.8 |
| Comparative C | 240 | 7 |
| Example 2 | 320 | 7 |
| Comparative C | 320 | 7.2 |
| Example 2 | 400 | 8.4 |
| Comparative C | 400 | 6.5 |

Methods of manufacturing bonded abrasive articles of the present disclosure provide a marked improvement over previous techniques. Use of a gamma-pyrone pore inducing material (e.g., ethyl maltol) readily generates desired porosity in the resultant bonded abrasive article using conventional manufacturing conditions, and does not give rise to environmental handling concerns. The gamma-pyrone pore inducing materials of the present disclosure have minimal, if any, negative affect upon designed geometries of the resultant bonded abrasive article.

Although the present disclosure has been described with reference to preferred embodiments, workers skilled in the art will recognize that changes can be made in form and detail without departing from the spirit and scope of the present disclosure.

What is claimed is:

1. A method for manufacturing a bonded abrasive article, the method comprising:
    preparing a bondable abrasive composition including abrasive particles, a binder medium and a gamma-pyrone pore inducing material;
    forming a precursor abrasive structure from the bondable abrasive composition;
    removing the gamma-pyrone pore inducing material from the precursor abrasive structure to provide a porous precursor abrasive structure; and
    processing the porous precursor abrasive structure to provide a bonded abrasive article.

2. The method of claim 1, wherein the gamma-pyrone pore inducing material includes ethyl maltol.

3. The method of claim 1, wherein the step of forming a precursor abrasive structure includes molding the bondable abrasive composition.

4. The method of claim 1, wherein the binder medium includes a vitreous bonding material.

5. The method of claim 4, wherein the binder medium further includes a water-based temporary binder.

6. The method of claim 1, wherein the step of removing the gamma-pyrone pore inducing material includes heating the precursor abrasive structure.

7. The method of claim 1, wherein the gamma-pyrone pore inducing material sublimates and/or evaporates as part of the step of removing the gamma-pyrone pore inducing material.

8. The method of claim 7, wherein the bondable abrasive composition is characterized by the absence of naphthalene.

9. The method of claim 1, wherein the step of processing the porous precursor abrasive structure includes heating the porous precursor abrasive structure.

10. The method of claim 9, wherein the bonding medium is a vitreous bonding medium, and further wherein the step of processing the porous precursor abrasive structure includes subjecting the porous precursor abrasive structure to a temperature of not less than 700° C.

11. The method of claim 1, wherein the bonded abrasive article is a vitrified bonded grinding wheel.

12. A bondable abrasive composition for use in forming a bonded abrasive article, the bondable abrasive composition including:
    abrasive particles;
    a binder medium; and
    a gamma-pyrone pore inducing material.

13. The bondable abrasive composition of claim 12, wherein the gamma-pyrone pore inducing material includes ethyl maltol.

14. The bondable abrasive composition of claim 13, characterized by the absence of naphthalene.

15. A precursor abrasive structure for use in forming a bonded abrasive article, the precursor abrasive structure including:
   abrasive particles;
   a binder medium; and
   a gamma-pyrone pore inducing material.

16. The precursor abrasive structure of claim 15, wherein the gamma-pyrone pore inducing material includes ethyl maltol.

17. The precursor abrasive structure of claim 16, characterized by the absence of naphthalene.

* * * * *